(12) United States Patent
Gondo et al.

(10) Patent No.: US 12,219,164 B2
(45) Date of Patent: *Feb. 4, 2025

(54) TRANSMISSION DEVICE, COMMUNICATION SYSTEM, TRANSMISSION METHOD, AND COMPUTER PROGRAM PRODUCT

(71) Applicant: KABUSHIKI KAISHA TOSHIBA, Tokyo (JP)

(72) Inventors: Shunichi Gondo, Ota (JP); Takumi Kurosaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,272

(22) Filed: Mar. 21, 2023

(65) Prior Publication Data
US 2023/0224487 A1    Jul. 13, 2023

Related U.S. Application Data

(63) Continuation of application No. 16/555,458, filed on Aug. 29, 2019, now Pat. No. 11,647,217.

(30) Foreign Application Priority Data

Nov. 2, 2018  (JP) .................................. 2018-207604

(51) Int. Cl.
*H04N 19/50*    (2014.01)
*H04L 65/611*   (2022.01)
(Continued)

(52) U.S. Cl.
CPC .......... *H04N 19/50* (2014.11); *H04L 65/611* (2022.05); *H04L 67/56* (2022.05); *H04N 19/15* (2014.11);
(Continued)

(58) Field of Classification Search
CPC ...... H04N 19/50; H04N 19/15; H04N 19/172; H04N 21/2187; H04N 21/23103;
(Continued)

(56) References Cited

U.S. PATENT DOCUMENTS 8,245,124 B1 * 8/2012 Gupta .................. G11B 27/034
715/202
8,341,409 B2 * 12/2012 Itani .................. G11B 20/00869
713/169
(Continued)

FOREIGN PATENT DOCUMENTS

EP         1553777 A1    7/2005
JP      2002244815 A     8/2002
(Continued)

OTHER PUBLICATIONS

Pantos et al., "RFC 8216 HTTP Live Streaming", <URL: http://www.ietf.org/rfc/rfc8216.txt>, Aug. 2017, 60 pages.
(Continued)

*Primary Examiner* — Richard A Hansell, Jr.
(74) *Attorney, Agent, or Firm* — Maier & Maier, PLLC

(57) ABSTRACT

A transmission device according to an embodiment includes one or more processors. The processors divide a plurality of pieces of transmission data to be transmitted into first data and second data. The processors transmit the first data to a server device configured to distribute the transmission data to a reception device. The processors store the second data in storage. The processors receive, from the reception device or the server device, a request for transmission of the second data. The processors transmit the second data to the server device in accordance with the request for transmission.

20 Claims, 12 Drawing Sheets

(51) Int. Cl.
   *H04L 67/56* (2022.01)
   *H04N 19/15* (2014.01)
   *H04N 19/172* (2014.01)
   *H04N 21/2187* (2011.01)
   *H04N 21/231* (2011.01)

(52) U.S. Cl.
   CPC ....... *H04N 19/172* (2014.11); *H04N 21/2187* (2013.01); *H04N 21/23103* (2013.01)

(58) Field of Classification Search
   CPC ........... H04N 7/181; H04N 21/234327; H04N 21/631; H04N 21/6587; H04N 19/503; H04N 19/593; H04L 65/611; H04L 67/56; H04L 65/612; H04L 65/70; H04L 65/762; H04L 67/565; H04L 65/80; H04L 67/06
   See application file for complete search history.

(56) References Cited

U.S. PATENT DOCUMENTS

| | | | | |
|---|---|---|---|---|
| 9,531,802 | B2* | 12/2016 | Aoyagi | H04L 67/108 |
| 9,967,578 | B2 | 5/2018 | Sato | |
| 2002/0150393 | A1* | 10/2002 | Yamada | H04N 21/6587 |
| | | | | 348/E7.071 |
| 2005/0071491 | A1 | 3/2005 | Seo | |
| 2005/0217459 | A1* | 10/2005 | Murakoshi | G06F 16/683 |
| | | | | 707/E17.101 |
| 2008/0010660 | A1* | 1/2008 | Sumiyoshi | H04N 21/2402 |
| | | | | 725/105 |
| 2009/0113068 | A1 | 4/2009 | Fujihira et al. | |
| 2011/0194600 | A1 | 8/2011 | Demos | |
| 2012/0004960 | A1* | 1/2012 | Ma | H04L 65/65 |
| | | | | 713/153 |
| 2012/0062732 | A1* | 3/2012 | Marman | G06T 7/277 |
| | | | | 348/142 |
| 2014/0153634 | A1* | 6/2014 | Inada | H04N 19/33 |
| | | | | 375/240.01 |
| 2014/0281003 | A1* | 9/2014 | Jain | H04L 65/762 |
| | | | | 709/231 |
| 2014/0289308 | A1* | 9/2014 | Tada | H04L 65/65 |
| | | | | 709/203 |
| 2016/0057194 | A1 | 2/2016 | Fujimori | |
| 2016/0073106 | A1* | 3/2016 | Su | H04N 21/8456 |
| | | | | 375/240.02 |
| 2016/0088294 | A1 | 3/2016 | Gondo et al. | |
| 2016/0261873 | A1* | 9/2016 | Abe | H04N 19/159 |
| 2018/0032547 | A1* | 2/2018 | Suzuki | G16H 30/20 |
| 2018/0048902 | A1* | 2/2018 | Kojima | H04N 19/40 |
| 2018/0295401 | A1* | 10/2018 | Tajiri | H04N 21/4381 |
| 2019/0149773 | A1* | 5/2019 | Sakuma | H04N 7/18 |
| | | | | 348/159 |
| 2019/0158551 | A1* | 5/2019 | Kurosaka | H04L 65/612 |

FOREIGN PATENT DOCUMENTS

| | | | |
|---|---|---|---|
| JP | 200526866 | A | 1/2005 |
| JP | 200551794 | A | 2/2005 |
| JP | 2005110244 | A | 4/2005 |
| JP | 2006127416 | A | 5/2006 |
| JP | 2009111890 | A | 5/2009 |
| JP | 2011249865 | A | 12/2011 |
| JP | 2012175274 | A * | 9/2012 |
| JP | 201663481 | A | 4/2016 |
| JP | 2016046598 | A | 4/2016 |
| JP | 2017158154 | A | 9/2017 |
| JP | 6239472 | B2 | 11/2017 |
| JP | 2019092133 | A | 6/2019 |
| KR | 1020060114080 | A | 11/2006 |
| KR | 100919313 | B1 | 10/2009 |
| KR | 1020110041409 | A | 4/2011 |
| KR | 1020110051336 | A | 5/2011 |
| KR | 1020150132372 | A | 11/2015 |

OTHER PUBLICATIONS

Office Action issued on Jun. 25, 2024, in corresponding Japanese Application No. 2023-099839, 10 pages.
Office Action issued on Oct. 29, 2024, in corresponding Japanese Application No. 2023-099839, 4 pages.

\* cited by examiner

TRANSMISSION DEVICE, COMMUNICATION SYSTEM, TRANSMISSION METHOD, AND COMPUTER PROGRAM PRODUCT

CROSS-REFERENCE TO RELATED APPLICATIONS

This application is a continuation of U.S. patent application Ser. No. 16/555,458, filed on Aug. 29, 2019, which is based upon and claims the benefit of priority from Japanese Patent Application No. 2018-207604, filed on Nov. 2, 2018; the entire contents of each of which are incorporated herein by reference.

FIELD

Embodiments described herein generally relate to a transmission device, a communication system, a transmission method, and a computer program product.

BACKGROUND

Adaptive streaming such as HTTP Live Streaming (HLS) and Moving Picture Experts Group-Dynamic Adaptive Streaming over HTTP (MPEG-DASH) can be applied to, for example, a system (video distribution system or video monitoring system) that distributes video (moving image data) captured by a camera for monitoring.

However, in conventional technology, there is a risk of increase of a load on a network line through which data (such as video) is transmitted and increase of a processing load on the system. For example, as the number of connected cameras increases, a load on network lines for transmitting video from the cameras and a processing load on a server that executes recording and distribution of the video potentially increase.

DETAILED DESCRIPTION

According to one embodiment, a transmission device according to an embodiment includes one or more processors. The processors divide a plurality of pieces of transmission data to be transmitted into first data and second data. The processors transmit the first data to a server device configured to distribute the transmission data to a reception device. The processors store the second data in storage. The processors receive, from the reception device or the server device, a request for transmission of the second data. The processors transmit the second data to the server device in accordance with the request for transmission.

Preferable embodiments of a transmission device will be described below in detail with the accompanying drawings.

In a video distribution system using the conventional adaptive streaming, a network line having a high transmission rate needs to be prepared to reliably record a high-quality video stream (exemplary transmission data) necessary for distribution of high-quality live video.

In a large-scale video distribution system in which a large number of cameras are connected, a large amount of camera video is constantly transmitted. Thus, to reduce a line load and cost, a network line having a low transmission rate is desirably used between each camera and a server device that records the video. However, the quality of live video is low with such a line having a low transmission rate, which potentially causes trouble to monitoring work.

Thus, the present embodiment achieves a video distribution system that can reduce a line load and a processing load without degrading the quality.

The following describes exemplary transmission data to which the present embodiment is applicable. The transmission data includes time series data, the temporal order of which is determined, such as moving image data or sensor data.

The moving image data is captured by an image capturing apparatus such as a camera or a frame capture. For example, the moving image data is acquired from the image capturing apparatus in real time and used as a content to be distributed. The moving image data temporarily stored in a storage medium after being captured may be used as a content to be distributed.

The sensor data represents a value sensed by a sensor (sensing device) and includes, for example, information of a time at which the data is sensed (sampled). The sensor may be any device. The sensor may be, for example, a microphone configured to acquire voice, a global positioning system (GPS) device configured to acquire position information, or a sensor configured to periodically or not periodically sense the temperature, speed, pressure, or the like of a surrounding environment to be sensed or an electronic device, and output the sensed value as sensor data.

The following description is mainly provided with an example in which the transmission data is the moving image data.

Figure 1:
FIG. 1 is a block diagram of a video distribution system according to the present embodiment.

FIG. 1 is a block diagram illustrating an exemplary configuration of a video distribution system according to the present embodiment. As illustrated in FIG. 1, the video distribution system includes a transmission device 100 (exemplary transmission device), a server 200 (exemplary server device), and a client 300 (exemplary reception device). The transmission device 100 and the server 200 are connected with each other through a network 401. The server 200 and the client 300 are connected with each other through a network 402.

The networks 401 and 402 may be any networks such as the Internet. For example, the networks 401 and 402 may be each a wired or wireless network. The networks 401 and 402 may be configured as one integrated network.

The configuration of a communication system illustrated in FIG. 1 is merely exemplary, and the present embodiment is not limited thereto. For example, a plurality of transmission devices 100, a plurality of servers 200, and a plurality of clients 300 may be provided. Each of the transmission device 100, the server 200, and the client 300 may be physically configured as one device or may be physically configured as a plurality of devices. For example, the server 200 may be established in a cloud environment.

Figure 2:
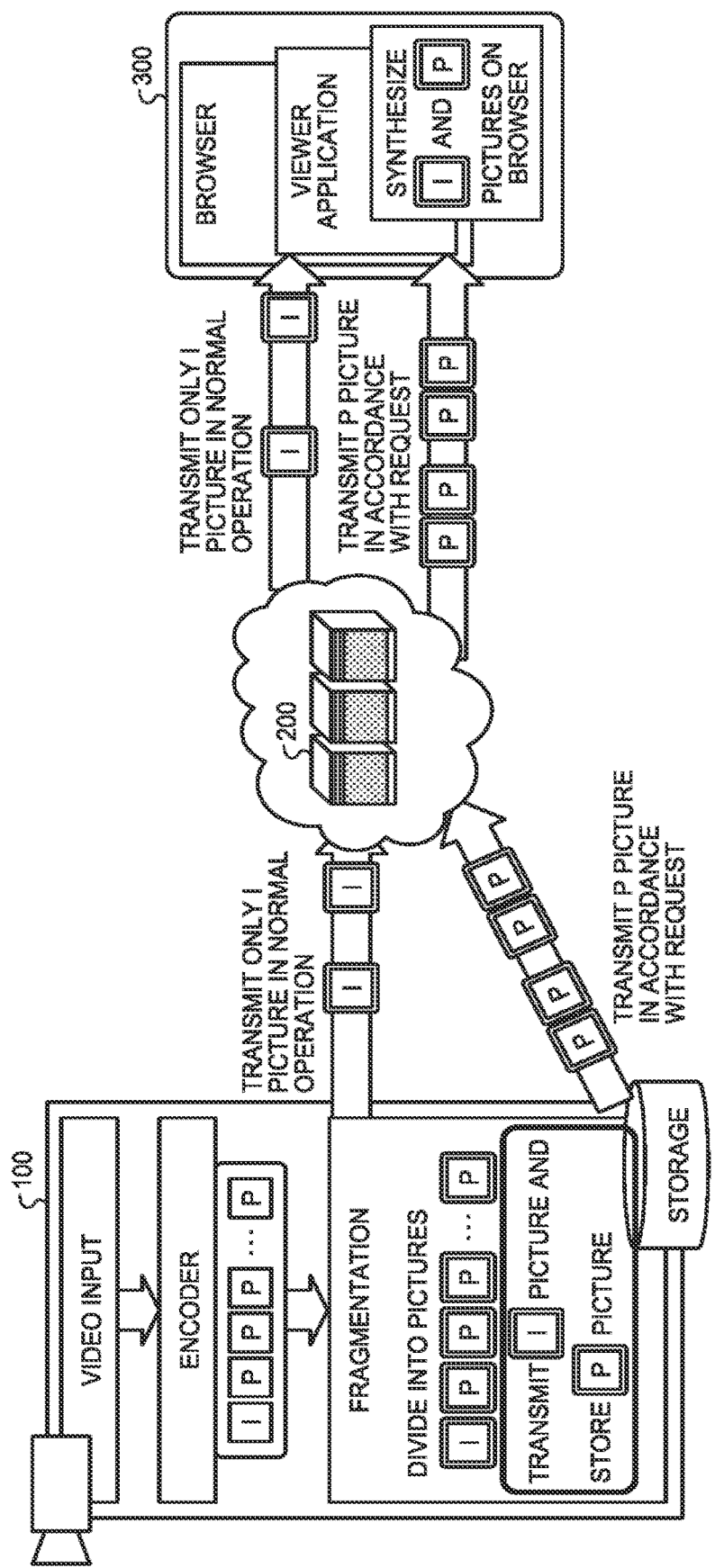
FIG. 2 is a diagram illustrating an outline of distribution processing performed by the video distribution system according to the present embodiment.

FIG. 2 is a diagram illustrating an outline of distribution processing performed by the video distribution system according to the present embodiment. The transmission device 100 receives video and encodes the received video. The transmission device 100 encodes the video by compression in accordance with a standard such as H.264. The encoded video includes, for example, an I picture and a P picture. The I picture is image data encoded by intra-frame prediction, and includes the entire screen range that can be played back alone. The P picture is image data encoded by inter-frame prediction based on the I picture. The P picture cannot be played back alone but can be played back in combination with the I picture.

The transmission device 100 divides (fragments) the encoded video for each picture. Then, the transmission device 100 transmits a divided picture part (for example, I pictures) to the server 200, and stores the remaining picture part (for example, P pictures) in storage. The transmission device 100 may also store the pictures transmitted to the server 200 in the storage for playback (local playback), backup, and the like.

Normally, the server 200 distributes, to the client 300, only I pictures transmitted from the transmission device 100. The client 300 uses, for example, a viewer application to display the distributed video. The viewer application is included in, for example, a browser and configured to display video for browsing. The I pictures is transmitted at a constant interval (for example, several pictures for one second, or one picture for several seconds), and thus video (stop-motion animation or frame-by-frame playback (intermittent) moving image) in which a still image (I picture) is updated at a constant interval is displayed on the client 300. The viewer application may be achieved as, for example, an application using Media Source Extensions (MSE) as an application programming interface for Hyper Text Markup Language (HTML) 5. This enables streaming playback using HTTP downloading.

When display of a P picture is requested by a user or the like operating the client 300, the transmission device 100 reads the stored P picture and transmits the read P picture to the server 200. The server 200 distributes the transmitted P picture to the client 300. The server 200 may directly distribute the transmitted P picture, or may distribute the P picture subjected only to fabrication processing (such as change of a transmission packet format) other than conversion processing (such as recompression) on the image data. The viewer application of the client 300 synthesizes and displays an I picture already received and the P picture received later. Accordingly, the client 300 can display a smoother video. Forwarded data (for example, the I picture) may be stored in the storage in the client 300 so that the data can be used for, for example, synthesis with the P picture received later. In other words, the forwarded data does not need to be transmitted again from the transmission device 100 and the server 200. This method can achieve reduction of the amount of transmission data as compared to a method in which the entire video data including P pictures is transmitted again.

As described above, without providing, for example, conversion processing such as recompression on image data, the server 200 distributes, to the client 300 directly or after fabricating only the transmission packet format, image data transmitted from the transmission device 100. For example, the server 200 does not need to execute processing of converting to video having reduced quality for distribution at a low transmission rate. Thus, increase of the processing load on the server 200 and degradation of the image quality can be avoided. In addition, the amount of communication can be reduced by distributing only I pictures in normal operation. In this manner, the line load and the processing load can be reduced without degrading the quality.

An I picture is partial data included in video (moving image data), but can be handled as a still image. For example, the browser (viewer application) operating on the client 300 can display an I picture included in moving image data as still image data in some cases. Thus, an I picture can be displayed as still image data without executing, for example, processing of compression to a still image such as a Joint Photographic Experts Group (JPEG) image. An I picture has a small data size (high compression efficiency) as compared to that of a still image in the JPEG format, and thus the line load and the processing load can be further reduced. When distributed video is used for image recognition, an I picture can be used as input data for the image recognition without converting the video into a still image.

Figure 3:
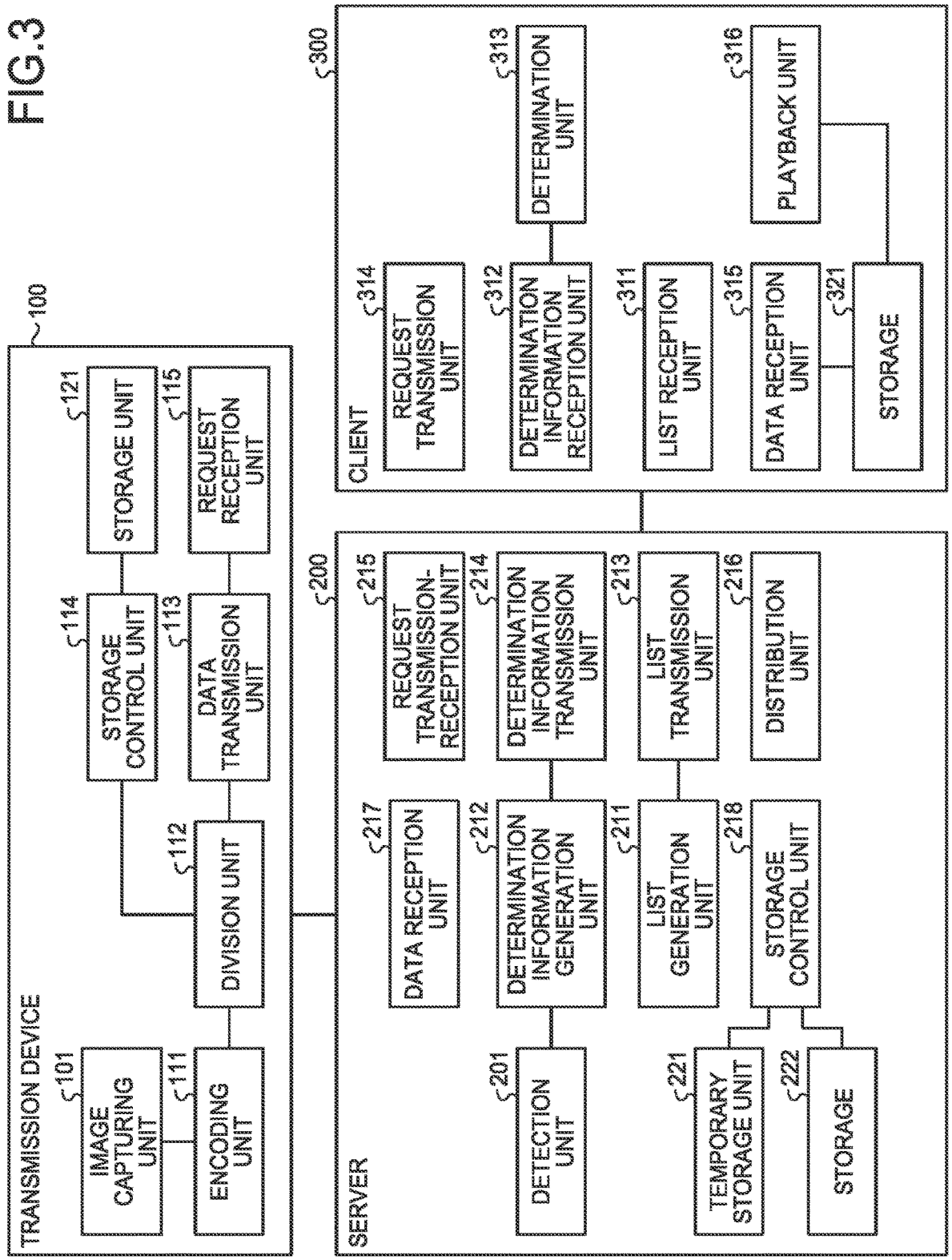
FIG. 3 is a functional block diagram of devices of the video distribution system according to the present embodiment.

The following describes the configurations of devices of the video distribution system according to the present embodiment in detail. FIG. 3 is a block diagram illustrating exemplary functional configurations of the devices of the video distribution system according to the present embodiment.

As illustrated in FIG. 3, the transmission device 100 includes an image capturing unit 101, storage 121, an encoding unit 111, a division unit 112, a data transmission unit 113, a storage control unit 114, and a request reception unit 115.

The image capturing unit 101 captures and outputs video (moving image data). The image capturing unit 101 may be achieved by, for example, an image sensor such as a charge coupled device (CCD) or a CMOS image sensor (CIS), or a frame buffer capture such as a frame memory, a frame grabber, or a screen capture.

The storage 121 stores therein various kinds of data used in various kinds of processing performed by the transmission device 100. For example, the storage 121 stores therein video captured by the image capturing unit 101.

The encoding unit 111 encodes video input from the image capturing unit 101. The encoding by the encoding unit 111 may be performed by any scheme, for example, an encoding scheme according to a standard such as H.264. For example, the encoding unit 111 encodes the video by compression, and outputs video including I and P pictures. The pictures of the encoded video correspond to a plurality of pieces of transmission data to be transmitted.

The division unit 112 divides the encoded video into data (first data) to be transmitted to the server 200 and data (second data) not to be transmitted but to be stored in the storage 121. For example, the division unit 112 divides the encoded video into pictures so that each I picture is data (fragment data) to be transmitted to the server 200 and each P picture is data (fragment data) to be stored in the storage 121. The division unit 112 may divide the video so that each divided picture is provided as one file (fragment file). The division unit 112 may perform division into the data to be stored in the storage 121 so that a plurality of pictures are included in one file.

The data division by the division unit 112 is not limited to this method but may be performed by any method. For example, the division unit 112 may divide the encoded video into I pictures selected at a constant interval from among a plurality of I pictures, and the other pictures (remaining I pictures and P pictures). Alternatively, for example, the division unit 112 may divide the encoded video into I pictures, P pictures selected at a constant interval from among a plurality of P pictures, and the other pictures (remaining P pictures). Alternatively, for example, the division unit 112 may divide the encoded video into I pictures selected at a constant interval from among a plurality of I pictures, P pictures selected at a constant interval from among a plurality of P pictures, and the other pictures (remaining I pictures and P pictures).

The data to be transmitted to the server 200 may be expressed in a format directly distributable by the server 200. For example, the division unit 112 may convert the divided data into a format according to a standard such as fragmented MP4 (fMP4).

The data to be transmitted to the server 200 may be expressed in a format with added data (metadata) that can be used for conversion into a format in which the data is distributed by the server 200. For example, the division unit 112 may add, to the divided data, the metadata including information necessary for conversion with which the server 200 can perform conversion into a format according to a standard such as fMP4. The information necessary for conversion includes, for example, information (such as an IP address and a port number) for identifying the transmission device 100, a time (such as day, hour, minute, and second at which the capturing is performed), and the position of an image (for example, information indicating the order of the image from the start) in the time.

The division unit 112 may change the size or encoding amount of the data to be transmitted to the server 200 in accordance with the band of the network 401. For example, the division unit 112 may divide, as the data to be transmitted to the server 200, data corresponding to a size that can be transmitted without delay or the like in an allocated band of the network 401, or data having an encoding bit rate within the band of the network 401. For example, when the band of the network 401 is large, the division unit 112 may divide all I pictures and some P pictures as the data to be transmitted to the server 200, and as the band decreases, may divide only the I pictures or some of the I pictures (by, for example, thinning the I pictures at a constant interval) as the data to be transmitted to the server 200. When some P pictures are to be distributed, the encoding may be performed by, for example, a method disclosed in Japanese Patent No. 6239472.

The division unit 112 may change the size or encoding amount of the data to be transmitted to the server 200 by dynamically switching the division method as described above in accordance with the band of the network 401 or a request from the client 300 or the server 200.

When the data encoded by the encoding unit 111 is simply divided, the size of each divided data is potentially not equal. For example, when the encoding unit 111 has the function of adjusting the encoding amount of each picture in accordance with the band of the network 401, the sizes of I and P pictures are potentially different from each other. Thus, when, for example, an I picture among the pictures encoded in this manner is divided as the data to be transmitted to the server 200, the sizes of divided I pictures are potentially different from each other.

Thus, the encoding unit 111 may adjust the encoding amount in accordance with the band of the network 401 so that divided data has a size or an encoding bit rate that can be transmitted without delay or the like in the allocated band of the network 401. For example, when the division unit 112 divides video so that only I pictures are transmitted to the server 200, the encoding unit 111 may encode the video so that the I pictures have a constant size that can be transmitted without delay or the like in the band of the network 401 or has an encoding bit rate within the band of the network 401.

The data transmission unit 113 transmits data to an external device such as the server 200. For example, the data transmission unit 113 transmits the data to be transmitted to the server 200 (first data) among data divided by the division unit 112 to the server 200. When a request for transmission of data stored in the storage 121 is received by the request reception unit 115 (to be described later), the data transmission unit 113 transmits the requested data to the server 200.

The storage control unit 114 controls processing of storage into the storage 121. For example, the storage control unit 114 stores, in the storage 121, data not to be transmitted to the server 200 among data divided by the division unit 112. The storage control unit 114 may store the data (first data) transmitted to the server 200 in the storage 121. In this case, the storage control unit 114 may manage the stored data by using metadata indicating that the transmitted data (first data) has been transmitted or that the second data is has not been transmitted. The storage control unit 114 may delete data stored in the storage 121, in accordance with a predetermined condition. For example, the storage control unit 114 may delete data stored for a constant duration.

The request reception unit 115 receives the request for transmission of data stored in the storage 121 from the server 200. When the request is transmitted from the client 300 through a control server or the like other than the server 200, the request reception unit 115 may receive the request for transmission of data stored in the storage 121 from such a control server.

The above-described components (the encoding unit 111, the division unit 112, the data transmission unit 113, the storage control unit 114, and the request reception unit 115) are each achieved by, for example, one or more processors. For example, each component may be achieved by a computer program executed by a processor such as a central processing unit (CPU), in other words, by software. The component may be achieved by a processor such as a dedicated integrated circuit (IC), in other words, by hardware. The component may be achieved by software and hardware. When a plurality of processors are used, each processor may achieve one of the components, or may achieve two or more of the components.

Functions of the transmission device 100 may be distributed to a plurality of devices physically or logically different from each other. For example, the functions may be distributed to a device (video input and an encoder in FIG. 2) including the image capturing unit 101 and the encoding unit 111, and a device including the remaining components (fragmentation and storage in FIG. 2). In this case, for example, data encoded by the encoding unit 111 is input to the latter device through a network or a communication path such as a coaxial cable. The latter device may acquire the encoded data through the communication path.

The following describes the configuration of the server 200. The server 200 distributes a distribution list and determination information to the client 300 through the network 402. The distribution list is a list in which information related to distributed data (hereinafter is also referred to as a content) is written. Normally, a content distributor writes metadata such as the acquisition source and bit rate of the content to the distribution list. A content acquirer acquires and analyzes the distribution list to specify a content to be acquired.

The content written in the distribution list includes not only a content that can be transmitted but also a content that is not ready to be transmitted and a content that is not allowed to be transmitted. The determination information is information based on which the reception device (client 300) determines whether to request transmission of a content included in the distribution list.

As illustrated in FIG. 3, the server 200 includes a detection unit 201, a list generation unit 211, a determination information generation unit 212, a list transmission unit 213, a determination information transmission unit 214, a request transmission-reception unit 215, a distribution unit 216, a data reception unit 217, a storage control unit 218, temporary storage 221, and storage 222.

The detection unit 201 detects that a content is ready to be transmitted. For example, the detection unit 201 determines that the content is ready to be transmitted when the content is provided from a content provision device (such as the transmission device 100). The detection unit 201 may monitor a storage region (for example, the temporary storage 221) in which the content is stored and determine that the content is ready to be transmitted when the content is stored.

The list generation unit 211 generates a distribution list. The list generation unit 211 generates a distribution list, for example, when requested by the client 300 to generate and transmit the distribution list. A trigger for generating a distribution list is not limited thereto, but may be any trigger. For example, the list generation unit 211 may generate, upon each elapse of a constant time, a distribution list of contents to be transmitted in the next duration. The list generation unit 211 may generate a distribution list when a content is provided by the provision device or when instructed to generate the distribution list.

Figure 4:
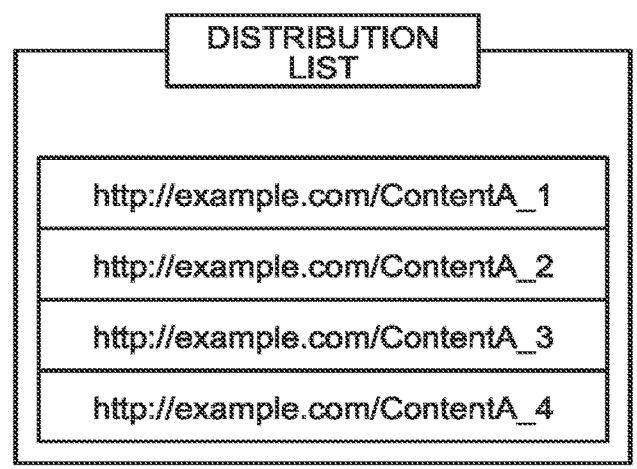
FIG. 4 is a diagram illustrating an exemplary data structure of a distribution list.

FIG. 4 is a diagram illustrating an exemplary data structure of a distribution list. As illustrated in FIG. 4, the distribution list includes identification information for identifying a content. FIG. 3 illustrates an example in which the uniform resource locator (URL) of the content is used as the identification information. The identification information may be any information other than the URL, with which the content can be identified. The distribution list may include information other than the identification information. In the present embodiment, for example, a distribution list including the URL of each divided data (such as a picture) is produced.

As illustrated in FIG. 3, the determination information generation unit 212 generates determination information. For example, when a content is ready to be transmitted, the determination information generation unit 212 generates determination information indicating that the content is ready to be transmitted, or when the content is not ready to be transmitted, the determination information generation unit 212 generates determination information indicating that the content is not ready to be transmitted. When a status indicating whether the content is ready to be transmitted has changed, the determination information generation unit 212 generates determination information updated in accordance with the changed status.

The determination information generation unit 212 generates determination information, for example, when requested by the client 300 to generate and transmit the determination information. When a distribution list is generated by the list generation unit 211, the determination information generation unit 212 may generate determination information at that state. A trigger for generating determination information is not limited thereto, but may be any trigger. For example, upon each elapse of a constant time, the determination information generation unit 212 may detect through, for example, the detection unit 201 whether the content is ready to be transmitted, and generate determination information updated in accordance with a result of the detection.

Figure 5:
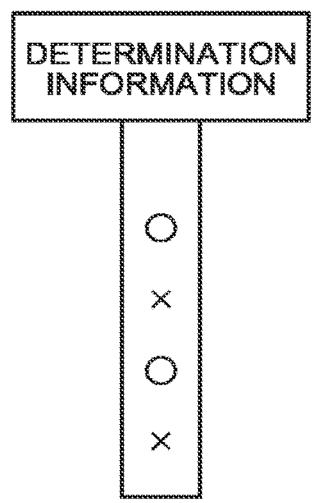
FIG. 5 is a diagram illustrating an exemplary data structure of determination information.

FIG. 5 is a diagram illustrating an exemplary data structure of determination information. The determination information in FIG. 5 is exemplary determination information for determining whether four contents written in the distribution list in FIG. 4 are ready to be transmitted. For example, a circle indicates that a content is ready to be transmitted, and a cross indicates that a content is not ready to be transmitted. In the example illustrated in FIG. 5, four pieces of the determination information (a circle or a cross) corresponding to the four contents ("ContentA_1", "ContentA_2", "ContentA_3", and "ContentA_4") corresponding to four URLs in FIG. 4 are specified in an order corresponding to the order in FIG. 4.

Determination information having a data structure other than that in FIG. 5 may be used when the determination information can be specified for each content. For example, the determination information may be associated with identification information of a content. To allow identification of to which distribution list the determination information corresponds, the determination information may be associated with information for identifying the distribution list.

The state in which a content is ready to be transmitted is, for example, a state in which the content to be distributed has been provided to the server 200 and is ready to be transmitted to the client 300. The state in which a content is not ready to be transmitted is, for example, a state in which the content to be distributed has not been provided to the server 200 and therefore cannot be transmitted to the client 300. The server 200 may transmit a content in accordance with a request from the client 300 (pull-type transmission), or may transmit a content without a request from the client 300 (push-type transmission).

The server 200 may specify whether a content is ready to be transmitted irrespective of whether the content has been provided. For example, to reduce a communication load, the server 200 may generate, for some or all of a plurality of provided contents, determination information indicating that the content is not ready to be transmitted so that these contents cannot be transmitted. In this manner, a content ready to be transmitted becomes not ready to be transmitted in some cases.

Determination information may be provided as one piece or a plurality of pieces for each content. For example, at least one piece of metadata of the content may be used as determination information. The metadata is, for example, range information indicating the range of the content, the data length of the content, and the kind of the content. The range information is, for example, information for specifying the range of part of data to be distributed as the content. When the range information is confirmed, the confirmed range information is set as determination information, or when the range information is yet to be confirmed, predetermined information (unconfirmation information) indicating that the range information is yet to be confirmed is set as determination information. When the unconfirmation information is set to the range information as determination information, the client 300 can determine that the corresponding content is not ready to be transmitted. In this manner, when the metadata is used as determination information, it suffices that such a data format is set to determine whether the content can be transmitted based on the metadata.

As illustrated in FIG. 3, the list transmission unit 213 transmits a distribution list generated by the list generation unit 211 to the client 300. For example, the list transmission unit 213 transmits the distribution list to the client 300 in advance before starting transmission of a content. The determination information transmission unit 214 transmits a determination information generated by the determination information generation unit 212 to the client 300.

The request transmission-reception unit 215 transmits and receives various requests. For example, the request transmission-reception unit 215 receives, from the client 300, a request for transmission of a distribution list, a request for transmission of determination information, and a request for transmission of a content. The request transmission-reception unit 215 transmits, to the transmission device 100, a request for transmission of a content stored in the storage 121.

The distribution unit 216 transmits a requested content to the client 300 having transmitted a request for transmission thereof. When the push-type transmission is employed, the distribution unit 216 may transmit a content without a request from the client 300.

The data reception unit 217 receives data transmitted from the transmission device 100. For example, the data reception unit 217 receives data divided as the data to be transmitted to the server 200. When a request for transmission of data stored in the storage 121 is transmitted, the data reception unit 217 receives the data transmitted by the transmission device 100 in response to the request for transmission.

The storage control unit 218 controls processing of storage in the temporary storage 221 and the storage 222. When data transmitted from the transmission device 100 and data obtained by converting the data transmitted from the transmission device 100 into a format in which the data is to be distributed by the server 200 are stored in the storage 222 and then distributed, writing processing anomalies such as insufficiency of the speed of processing of storing data in the storage 222 for keeping up with the speed of distribution, and temporary freeze of processing of writing to the storage 222 occurs, and the distribution cannot be normally performed in some cases. Thus, the storage control unit 218 stores the data transmitted from the transmission device 100 in the temporary storage 221 as a storage medium with which the writing processing anomalies as described above do not occur. The distribution unit 216 reads data from the temporary storage 221 and distributes the data to the client 300 when the data is stored in the temporary storage 221. In this case, the data transmitted from the transmission device 100 is finally stored in the storage 222. Thus, the distribution unit 216 may operate as if distribution is performed from the storage 222 in response to a request from the client 300. Specifically, data stored in the temporary storage 221 may be returned in response to a request for data stored in the storage 222. Such a function can be achieved by recording association of these files on the server 200 (by using, for example, a database, a file, or a symbolic link) and referring to the association at distribution.

Then, the storage control unit 218 performs processing (writing processing) of writing data stored in the temporary storage 221 to the storage 222. In the writing processing, the storage control unit 218 may merge a plurality of pieces of data stored in the temporary storage 221 into one piece of data and store the merged data in the storage 222. For example, the storage control unit 218 may merge a plurality of pieces of data captured in a constant duration so that the pieces of data are included in one file, and may write the merged file (merge file) to the storage 222. Accordingly, it is possible to avoid failure that the number of files stored in the storage 222 exceeds, for example, a number allowed by an operating system and data cannot be stored any more.

When a plurality of pieces of data are merged into one piece of data and stored in the storage 222 and then a request for transmission of data included in the merged data is received from the client 300, a function of specifying the data in the merged data is needed. Thus, for example, the list generation unit 211 may update distribution list so that the distribution list includes specification information for specifying the data. For example, the list generation unit 211 produces distribution list in which specification information (such as a byte offset from the start) indicating the position of data in the merge file is associated with identification information (such as an URL) of the data, and sends the distribution list to the client 300.

When referring to the updated distribution list and requesting transmission of data, the client 300 specifies the identification information of the requested data and the specification information associated therewith. For example, the client 300 requests the data by using information obtained by adding the specification information to an URL indicating the identification information of the data. The client 300 may request the data through a transmission request with a header (such as an HTTP extension header) including the specification information.

A file name requested in this case may be the original file name before division. This facilitates determination of whether the data is already received and cached on the client 300 and prevents acquired data from being acquired again. In this case, the server 200 needs to specify data (merge file) obtained by merging original divided files (fragment files). This can be achieved by a method (1) in which information of the merge file for the fragment files is transmitted in advance as the specification information transmitted to the client 300, and written to the HTTP extension header upon a request by the client 300, or by a method (2) in which the server 200 specifies the merge file from requested fragment file names at a response to the request. The method (2) can be performed by, for example, (2-1) recording association with the fragment files when the merge file is produced (by using, for example, a database, a file, a symbolic link), or (2-2) automatically achieving the specification according to a naming rule (in the example illustrated in FIG. 4, a merge file name for ContentA_1 to ContentA_4 is ContentsA).

The server 200 specifies desired data from the merged data by using the specification information transmitted from the client 300, and distributes the specified data to the client 300 from which the request is sent.

The storage control unit 218 may delete data stored in the storage 222, in accordance with a predetermined condition. For example, the storage control unit 218 may delete data stored for a constant duration. The storage control unit 218 may delete data at stages upon each elapse of a constant time. For example, the storage control unit 218 deletes all or some P pictures in the storage 222 when a predetermined duration (for example, one day) has elapsed, and thereafter deletes P pictures and I pictures in the storage 222 by thinning at stages upon each elapse of a predetermined duration (equal to or different from the first duration). Through such processing, it is possible to obtain video, the intermittency of which increases as time elapses, without executing, for example, processing of conversion into video at degraded quality when the amount of storage needs to be reduced for long-period recording. The deletion of P pictures at stages may be performed by, for example, an encoding method disclosed in Japanese Patent No. 6239472.

For example, the storage control unit 218 may delete transmitted data as a priority. In this case, the storage control unit 218 may determine whether data has been transmitted by using metadata indicating whether the data has been transmitted. In addition, the storage control unit 218 may prepare, in advance, other metadata to be referred to in the deletion processing. This metadata is, for example, data for determining which data corresponds to which picture. More specifically, the metadata includes, for example, a time (such as day, hour, day, hour, minute, and second at which the capturing is performed), the position (for example, information indicating the order from the start) of an image in the time, the name of a file, and a byte offset from the start of the file.

The temporary storage 221 temporarily stores therein received data. For example, the temporary storage 221 may be achieved by a transitory memory such as a dynamic random access memory (DRAM).

The storage 222 stores therein various kinds of data to be used by the server 200. For example, the storage 222 stores therein a content to be distributed, a generated distribution list, and generated determination information. The storage 222 may be achieved by any typically used storage medium such as a memory card, a random access memory (RAM), a hard disk drive (HDD), or an optical disk.

When the writing processing anomalies as described above do not occur, no temporary storage 221 may be provided.

The above-described components (the detection unit 201, the list generation unit 211, the determination information generation unit 212, the list transmission unit 213, the determination information transmission unit 214, the request transmission-reception unit 215, the distribution unit 216, the data reception unit 217, and the storage control unit 218) are each achieved by, for example, one or more processors. For example, each component may be achieved by a computer program executed by a processor such as a CPU, in other words, by software. The component may be achieved by a processor such as a dedicated IC, in other words, by hardware. The component may be achieved by software and hardware. When a plurality of processors are used, each processor may achieve one of the components or may achieve two or more of the components.

Functions of the server 200 may be distributed to a plurality of devices physically or logically different from each other. For example, the functions may be distributed to a server device configured to transmit distribution list and a server device configured to transmit a content. Alternatively, for example, the functions may be distributed to a server device configured to receive data from the transmission device 100 and store the data in the temporary storage 221 and the storage 222, and a server device configured to read data from the temporary storage 221 and the storage 222 and distribute the data.

The following describes functions of the client 300. As illustrated in FIG. 3, the client 300 includes a list reception unit 311, a determination information reception unit 312, a determination unit 313, a request transmission unit 314, a data reception unit 315, a playback unit 316, and storage 321.

The list reception unit 311 receives a distribution list from the server 200. The determination information reception unit 312 receives determination information from the server 200.

The determination unit 313 determines a content to be requested for transmission based on the distribution list and the determination information. For example, the determination unit 313 determines, as a content to be requested for transmission, a content for which a circle is set as the determination information as illustrated in FIG. 5 among contents, the URLs of which are written in the distribution list illustrated in FIG. 4. When the above-described range information is used as the determination information, the determination unit 313 determines, as a content to be requested for transmission, for example, a content, to the range information of which no unconfirmation information is set. When a plurality of pieces of determination information are used, the determination unit 313 may determine a content to be requested for transmission in accordance with combination of the pieces of determination information. For example, when all pieces of determination information indicate that the corresponding contents are ready to be transmitted, the determination unit 313 determines the corresponding contents as contents to be requested for transmission.

The request transmission unit 314 transmits, to the server 200, a request for transmission of a content determined to be requested for transmission. The data reception unit 315 receives, from the server 200, the content transmitted in accordance with the transmission request transmitted by the request transmission unit 314. The playback unit 316 playbacks the received content.

The storage 321 stores therein various kinds of data to be used by the client 300. For example, the storage 321 stores therein transmitted distribution list, transmitted determination information, and a distributed content.

The above-described components (the list reception unit 311, the determination information reception unit 312, the determination unit 313, the request transmission unit 314, the data reception unit 315, and the playback unit 316) are each achieved by, for example, one or more processors. For example, each component may be achieved by a computer program executed by a processor such as a CPU, in other words, by software. The component may be achieved by a processor such as a dedicated IC, in other words, by hardware. The component may be achieved by software and hardware. When a plurality of processors are used, each processor may achieve one of the components or may achieve two or more of the components.

When the distribution list and the determination information as described above are used, for example, the server 200 does not need to produce and transmit the distribution list at each update. The client 300 can more easily analyze an updated part by referring to the determination information. Specifically, it is possible to efficiently acquire and analyze information equivalent to the latest distribution list without acquiring and analyzing the distribution list again.

The distribution list may be produced and transmitted at, for example, each data update without using the determination information. In this case, functions (such as the determination information generation unit 212, the determination information transmission unit 214, and the determination information reception unit 312) related to the determination information do not need to be provided. When, for example, the push-type transmission is employed, the server 200 may distribute video to the client 300 without using the distribution list.

Figure 6:
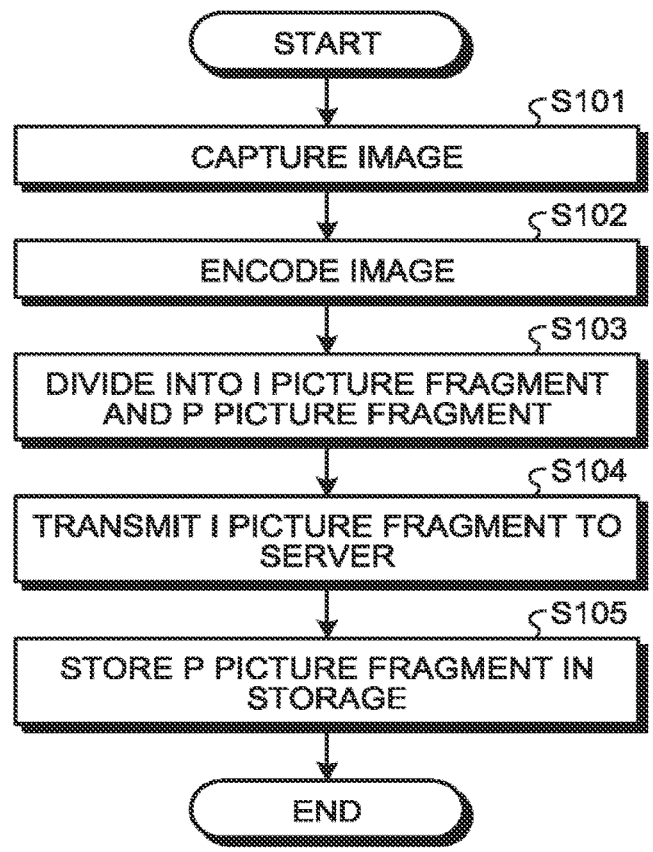
FIG. 6 is a flowchart of transmission processing in the present embodiment.

The following describes data transmission processing performed by the transmission device 100 according to the present embodiment. FIG. 6 is a flowchart illustrating exemplary transmission processing in the present embodiment.

The image capturing unit 101 captures video to be distributed (step S101). The encoding unit 111 encodes the video input from the image capturing unit 101 (step S102). The division unit 112 divides the video into data to be transmitted to the server 200 and data to be stored in the storage 121. For example, the division unit 112 divides the input video into an I picture fragment and a P picture fragment (step S103). The data transmission unit 113 transmits the I picture fragment to the server 200 (step S104). The storage control unit 114 stores the P picture fragment in the storage 121 (step S105).

Figure 7:
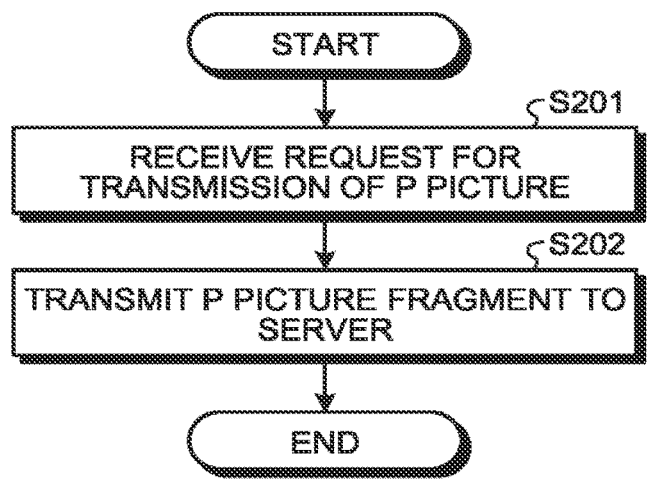
FIG. 7 is a flowchart of stored data transmission processing.

The following describes processing of transmitting data stored in the storage 121. FIG. 7 is a flowchart illustrating exemplary processing of transmitting data stored in the storage 121.

The request reception unit 115 receives, from the server 200 (or the control server), a request for transmission of data stored in the storage 121 (step S201). When P pictures are stored in the storage 121, the request reception unit 115 receives a request for transmission of any of the stored P pictures. The data transmission unit 113 reads the requested P picture from the storage 121, and transmits the read P picture to the server 200 (step S202).

Figure 8:
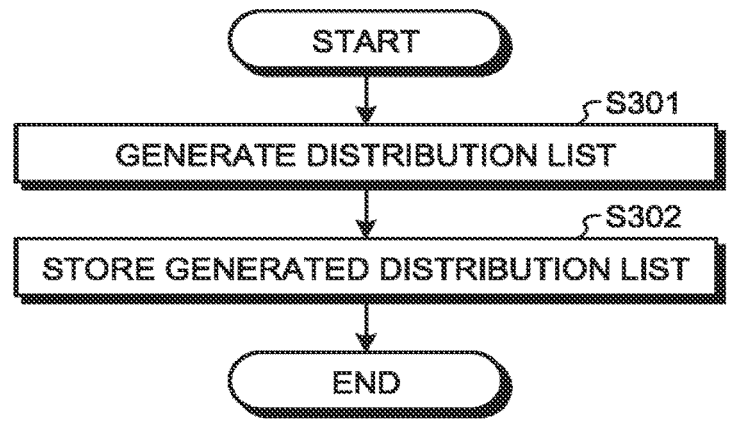
FIG. 8 is a flowchart of list generation processing in the present embodiment.

The following describes list generation processing performed by the server 200 according to the present embodiment thus configured. In the list generation processing, the server 200 generates a distribution list. FIG. 8 is a flowchart illustrating exemplary list generation processing in the present embodiment.

The list generation unit 211 of the server 200 generates a distribution list, for example, in accordance with a request from the client 300 (step S301). The list generation unit 211 stores the generated distribution list in, for example, the storage 222 (step S302).

For example, contents to be distributed are temporally continuous contents of ContentA_1, ContentA_2, ContentA_3, and ContentA_4, and ContentA_1 and ContentA_3 are distributable. In this case, the list generation unit 211 generates a distribution list for distributing ContentA_1, ContentA_2, ContentA_3, and ContentA_4. FIG. 4 described above illustrates an exemplary distribution list generated in this case.

Figure 9:
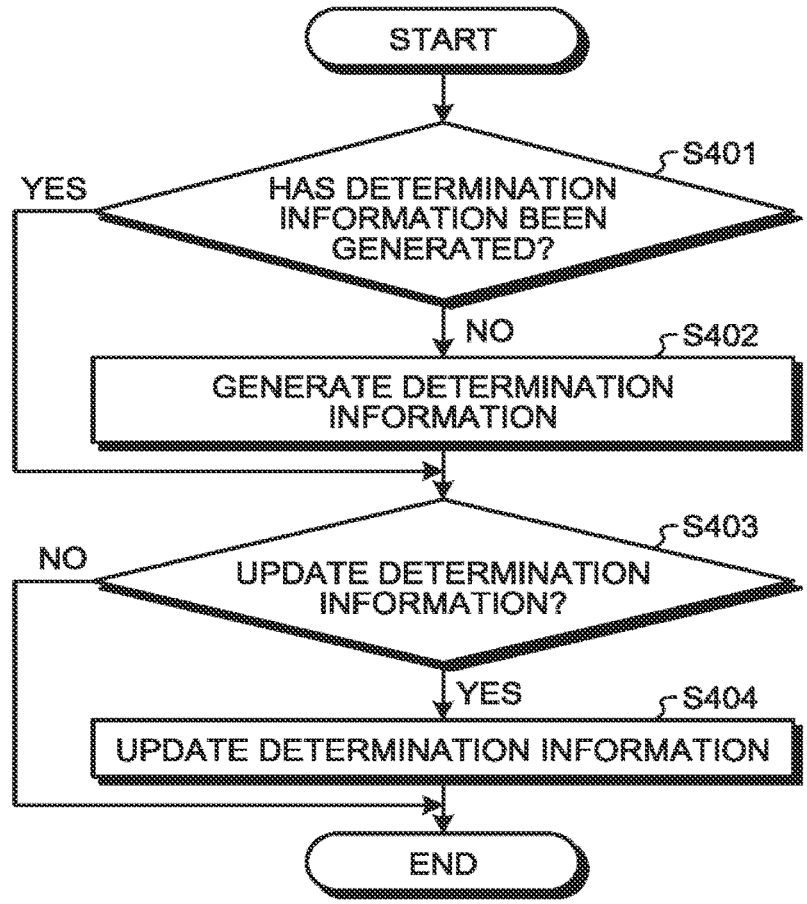
FIG. 9 is a flowchart of determination information generation processing in the present embodiment.

The following describes determination information generation processing performed by the server 200 according to the present embodiment. In the determination information generation processing, the server 200 generates determination information. The determination information generation processing is executed, for example, when a request for transmission of determination information is transmitted from the client 300. FIG. 9 is a flowchart illustrating exemplary determination information generation processing in the present embodiment.

The determination information generation unit 212 of the server 200 determines whether determination information has been generated for a content to be distributed (step S401). When determination information has not been generated (No at step S401), the determination information generation unit 212 generates determination information for the content (step S402). FIG. 5 described above illustrates exemplary determination information generated in the example (in which ContentA_1 and ContentA_3 are distributable) described with reference to FIG. 8.

After having generated determination information or when determination information has been generated (Yes at step S401), the determination information generation unit 212 determines whether to update the generated determination information (step S403). For example, when having received, from the detection unit 201, a detection result indicating that the content has become ready to be transmitted, the determination information generation unit 212 determines that the determination information is to be updated.

When having determined that the determination information is to be updated (Yes at step S403), the determination information generation unit 212 updates the determination information (step S404). After having updated the determination information or when having determined that the determination information is not to be updated (No at step S403), the determination information generation unit 212 ends the determination information generation processing.

The server 200 keeps the generated distribution list and the generated determination information in a state distributable through the network 402. The client 300 can access the server 200 and acquire the distribution list and the determination information.

Figure 10:
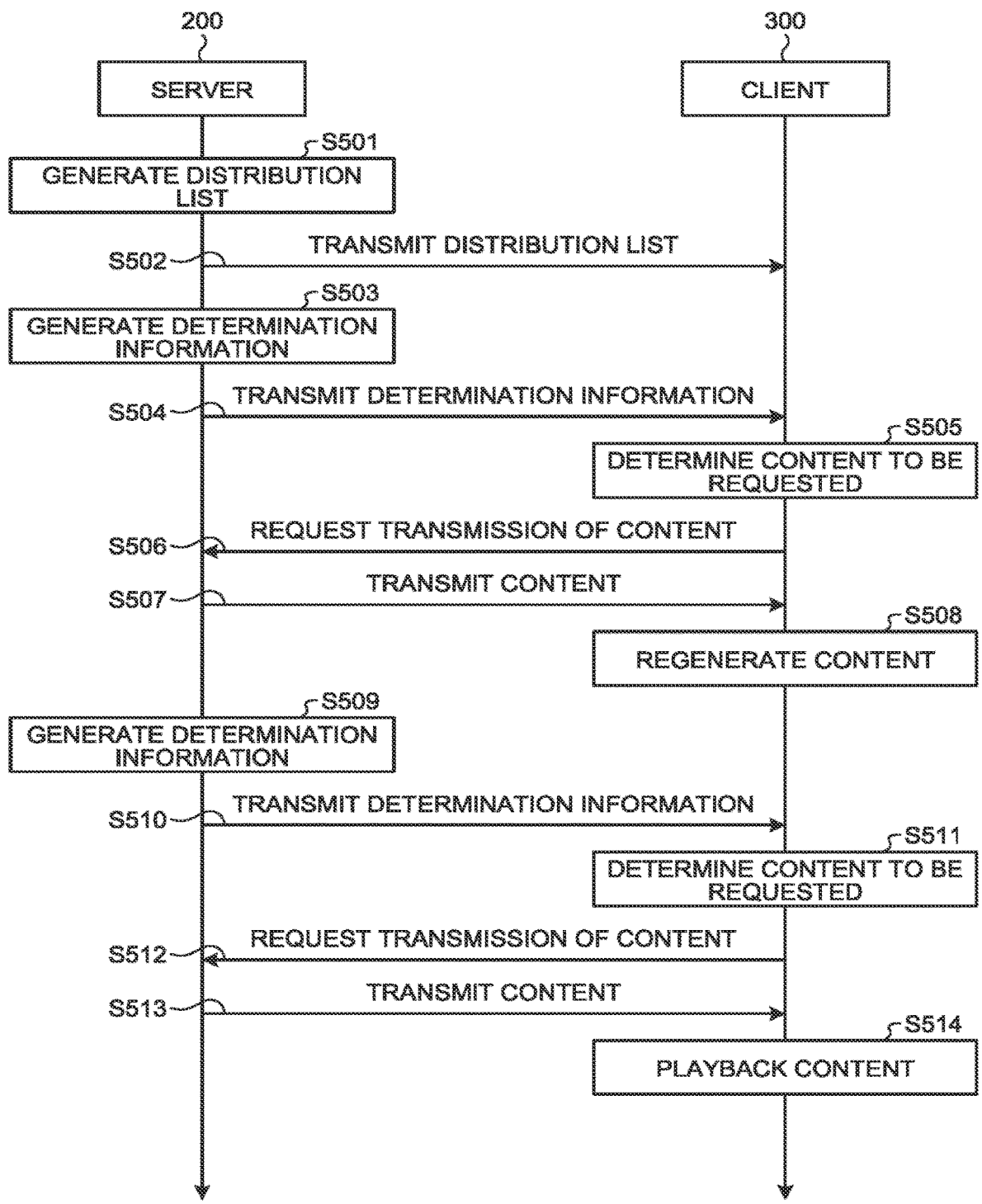
FIG. 10 is a sequence diagram of content distribution processing in the present embodiment.

The following describes content distribution processing performed by the communication system according to the present embodiment. FIG. 10 is a sequence diagram illustrating exemplary content distribution processing in the present embodiment.

The list generation unit 211 of the server 200 generates a distribution list (step S501). This processing corresponds to, for example, the above-described list generation processing. The list transmission unit 213 of the server 200 transmits the distribution list to the client 300, for example, in accordance with a request from the client 300 (step S502).

The determination information generation unit 212 of the server 200 generates determination information (step S503). This processing corresponds to, for example, the above-described determination information generation processing. The determination information transmission unit 214 of the server 200 transmits the determination information to the client 300, for example, in accordance with a request from the client 300 (step S504).

The list reception unit 311 and the determination information reception unit 312 of the client 300 receive the distribution list and the determination information, respectively. Thereafter, the determination unit 313 of the client 300 determines a content to be requested for transmission based on the distribution list and the determination information thus received (step S505). For example, when the distribution list illustrated in FIG. 4 is received, the determination unit 313 analyzes the received distribution list to obtain URLs for acquiring ContentA_1 to ContentA_4. The determination unit 313 also analyzes the received determination information to determine a content ready to be transmitted among contents written in the distribution list.

Figure 11:
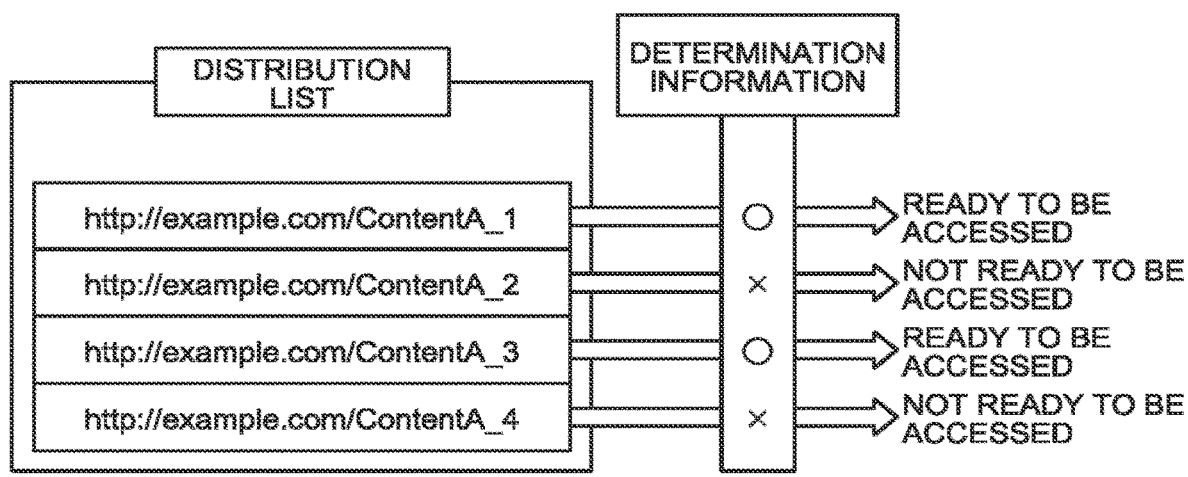
FIG. 11 is a diagram for describing an example in which determination is made on the distribution list based on the determination information.

FIG. 11 is a diagram for describing an example in which determination is made on the distribution list illustrated in FIG. 4 based on the determination information illustrated in FIG. 5. As illustrated in FIG. 11, the determination unit 313 can determine that ContentA_1 is ready to be transmitted (accessed) by combining the URL for acquiring ContentA_1 written in the distribution list and the determination information corresponding to ContentA_1. Similarly, the determination unit 313 can determine that ContentA_2 is not ready to be transmitted (accessed).

As illustrated in FIG. 10, the request transmission unit 314 transmits, to the server 200, a request for transmission of the content determined to be requested for transmission (step S506). The distribution unit 216 of the server 200 transmits the requested content to the client 300 (step S507). The data reception unit 315 of the client 300 receives the content, and the playback unit 316 thereof playbacks the received content (step S508).

When a content expressed in a format directly distributable from the server 200 is transmitted from the transmission device 100, the distribution unit 216 transmits, directly to the client 300 without conversion, the content transmitted from the transmission device 100. When the content is transmitted in a format additionally including metadata with which the content can be converted into a format in which the content is distributed by the server 200, the distribution unit 216 converts the transmitted content into the distributable format in accordance with the metadata, and transmits the converted content to the client 300.

Thereafter, for example, ContentA_2 has become distributable. In this case, the detection unit 201 of the server 200 detects that ContentA_2 has become distributable. The determination information generation unit 212 generates determination information updated in accordance with a result of the detection (step S509).

Figure 12:
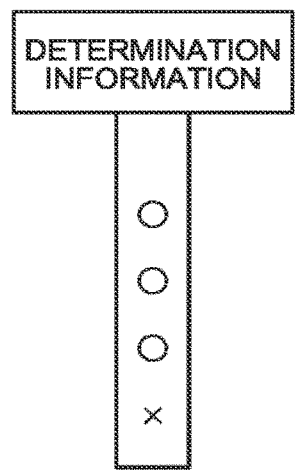
FIG. 12 is a diagram illustrating exemplary updated determination information.

FIG. 12 is a diagram illustrating exemplary updated determination information. As illustrated in FIG. 12, the determination information generation unit 212 updates the determination information corresponding to ContentA_2 from a cross to a circle. The updated determination information is kept in a state distributable through the network 402.

As illustrated in FIG. 10, the determination information transmission unit 214 of the server 200 transmits the updated determination information to the client 300, for example, in accordance with a request from the client 300 (step S510). The following steps S511 to S514 are same as steps S505 to S508.

Figure 13:
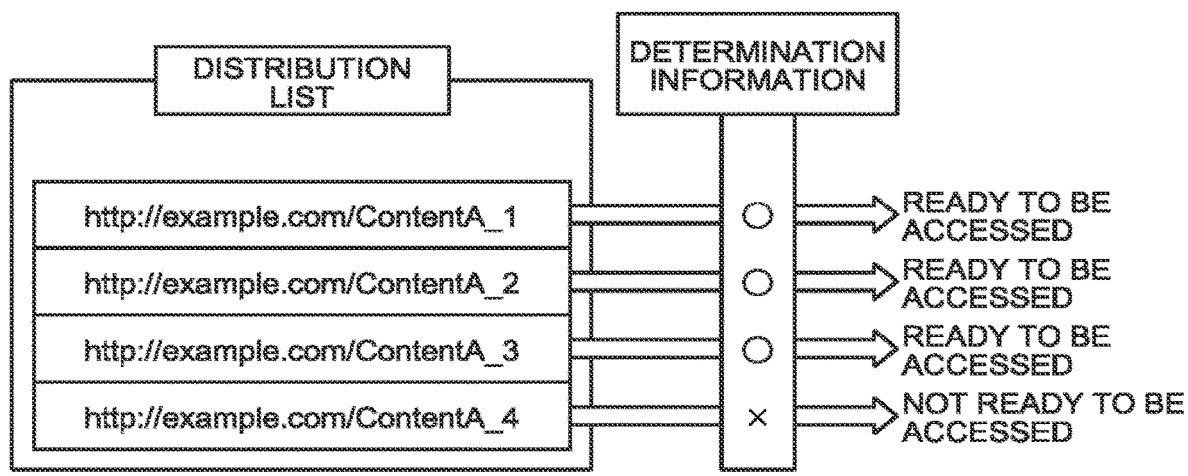
FIG. 13 is a diagram for describing an example in which determination is made on the distribution list based on the determination information.

FIG. 13 is a diagram for describing an example in which determination is made on the distribution list illustrated in FIG. 4 based on the determination information illustrated in FIG. 12. As illustrated in FIG. 13, the determination unit 313 can determine that ContentA_2 has become ready to be transmitted (accessed).

In this manner, when ContentA_2 has become distributable, the client 300 can obtain the latest state of each content only by applying the updated determination information to the already received distribution list without acquiring the distribution list again.

The present embodiment is applicable to, for example, a system that monitors video captured by a drive recorder. A system to which the present embodiment is applicable is not limited to this system. For example, the present embodiment may be applied to a system that distributes and monitors sensor data obtained by a sensor, and a system that distributes and monitors moving image data obtained by an image capturing apparatus or the like mounted on a moving object. A moving object is, for example, a person, a robot, a vehicle (automobile, two-wheel vehicle, or train), a truck, an object that can fly (a manned airplane, an unmanned airplane (for example, an unmanned aerial vehicle (UAV), or a drone)), or a personal mobility. The moving object is, for example, a moving object that travels through driving operation by a person, or a moving object that can automatically travel (automated driving) without driving operation by a person.

The present embodiment is also applicable to, for example, a monitoring system that monitors the history of operation of a screen (human machine interface (HMI)) of an instrument monitoring control system. The screen operation history can be obtained by, for example, a function of capturing and recording a screen displayed on a display device. Image data obtained in this manner can be used in place of video captured by the transmission device 100.

In the instrument monitoring control system, normally, a large number of monitoring screens are used, and thus, the monitoring system of the screen operation history needs to monitor images of the large number of monitoring screens side by side in some cases. Typically, such processing of displaying a large number of videos in parallel has a high processing load, but in the present embodiment, only divided data (for example, I pictures) can be displayed, and thus increase of the processing load can be reduced.

First Modification

Figure 14:
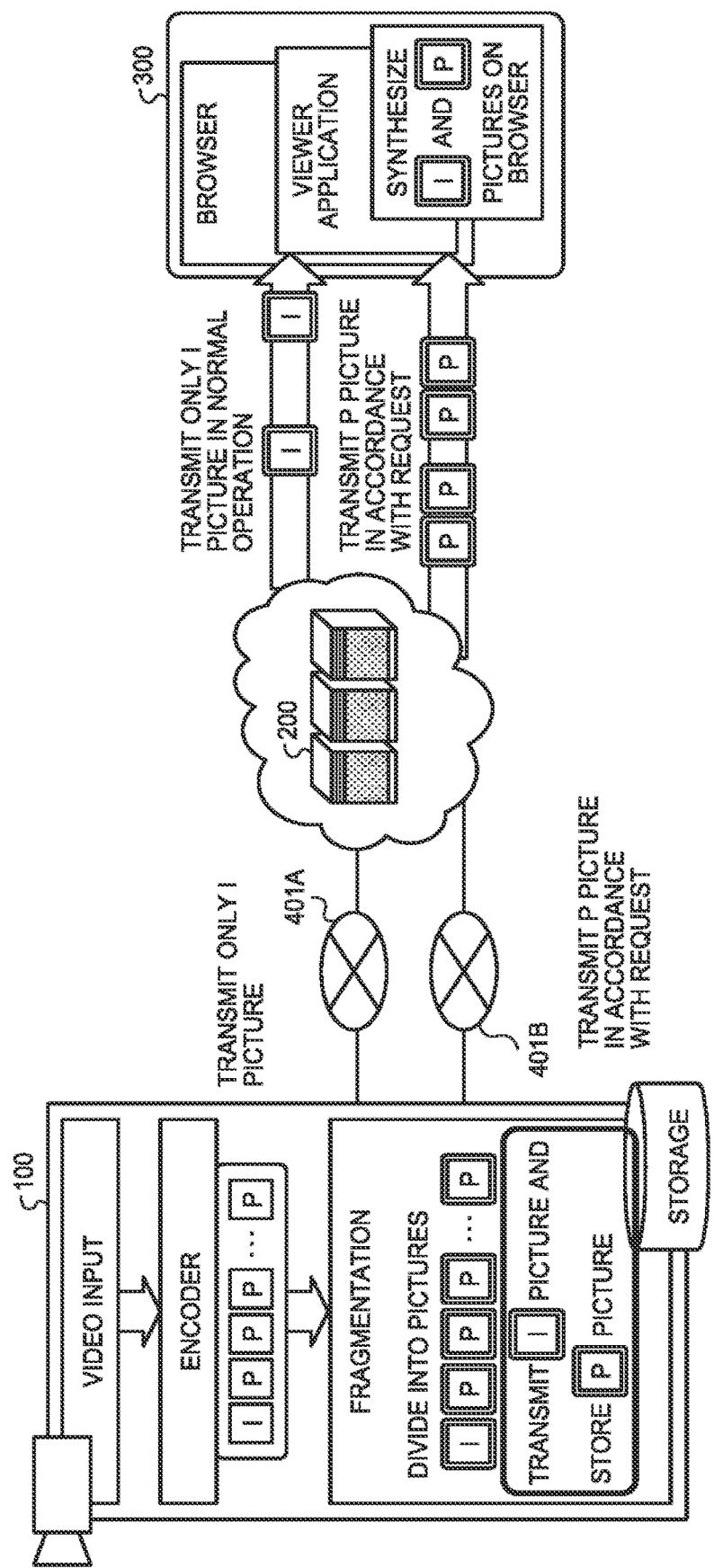
FIG. 14 is a diagram illustrating an exemplary configuration of a video distribution system according to a modification.

The network 401 may include a plurality of communication lines, part (for example, I pictures) of data divided by the division unit 112 may be transmitted to the server 200 through any (a communication line 401A) of the communication lines, and the remaining data (for example, P pictures) may be transmitted to the server 200 through another communication line (communication line 401B) among the communication lines. FIG. 14 is a diagram illustrating an exemplary configuration of a video distribution system according to a first modification thus configured. For example, the data transmission unit 113 may distribute the I pictures through the communication line 401A by live stream, and may transmit the P pictures through the communication line 401B at an optional timing.

Second Modification

Divided data may be stored in a divided manner in the storage 121 in the transmission device 100 without being transmitted to the server 200. Accordingly, for example, only necessary pictures (for example, I pictures) can be read from the storage 121 and displayed. The processing load can be reduced by a method of displaying only I pictures than a method of displaying all pictures including P pictures. Thus, for example, the client 300 or the like having a limited processing capacity can read only I pictures from the storages 121 of a plurality of transmission devices 100 and display the I pictures in parallel. In addition, the remaining P pictures and the like can be read at stages as necessary to achieve moving display.

In this case, similarly to the storage control unit 218 of the server 200, the storage control unit 114 may delete data stored for a constant duration or delete data at stages upon each elapse of a constant time. For example, when the storage capacity is insufficient, it is possible to delete only P pictures and keep I pictures as data that can be displayed in a thinned manner instead of deleting all data including the I pictures and the P pictures in chronological order, thereby achieving long-period storage and low capacity consumption of data.

Third Modification

When video is divided into pictures and distributed, the size of a distribution list potentially increases. Thus, the list generation unit 211 may produce distribution lists by using a plurality of files in a hierarchical structure. For example, the list generation unit 211 may hierarchically configure the distribution lists in units of year, month, day, time, or the like. For example, a distribution list at the lowermost layer includes identification information of each fragment data divided into a certain range of time. The next higher distribution list includes information for identifying at least one distribution list corresponding to time included in a certain day. The next higher distribution list includes information for identifying at least one distribution list corresponding to a day included in a certain month. The next higher distribution list includes information for identifying at least one distribution list corresponding to a month included in a certain year.

Fourth Modification

Figure 15:
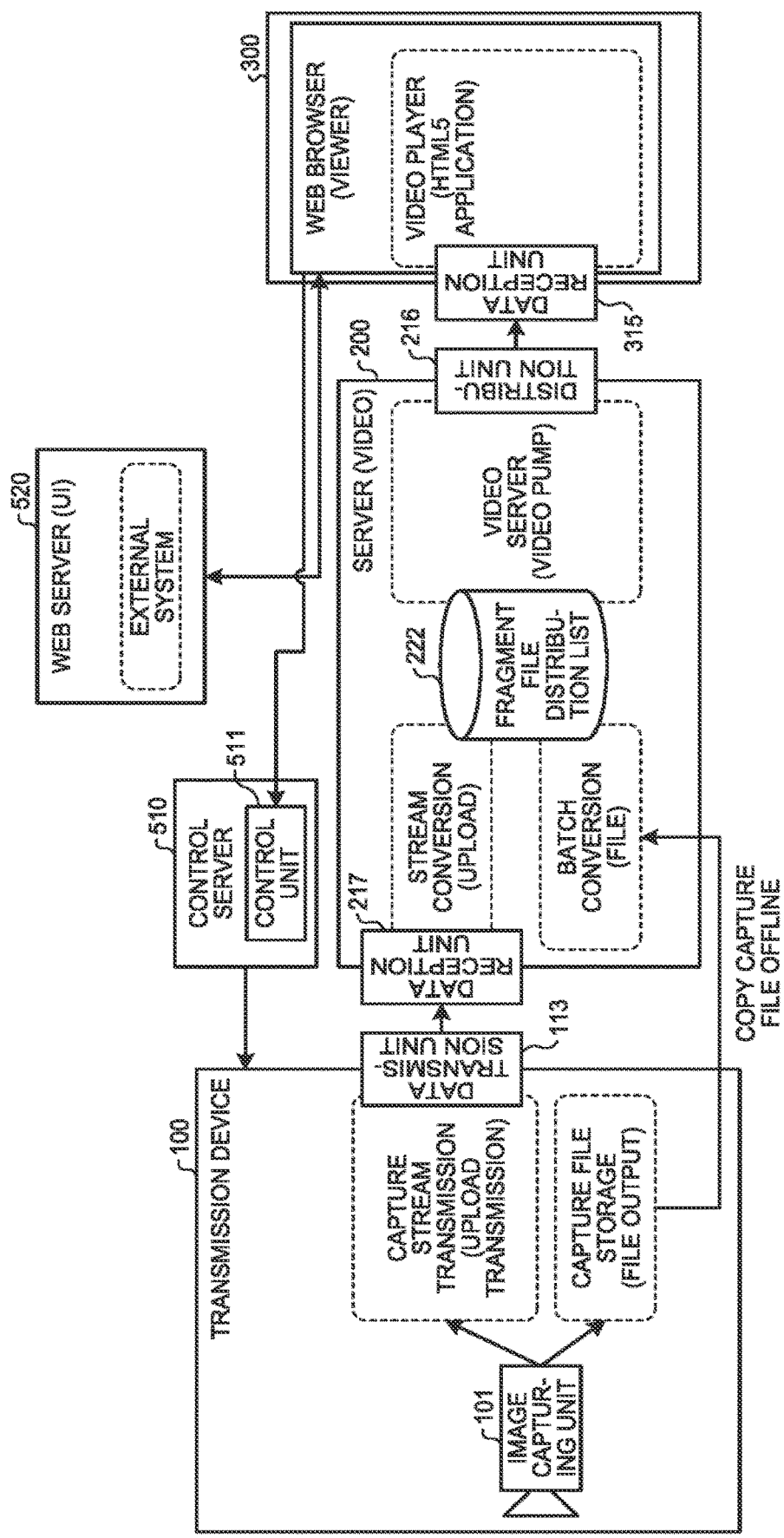
FIG. 15 is a diagram illustrating an outline of distribution processing performed by the video distribution system according to the modification.

FIG. 15 is a diagram illustrating an outline of distribution processing performed by a video distribution system according to a fourth modification. The video distribution system according to the present modification further includes a control server 510 and a Web server 520. In the present modification, the server 200 is configured as a Web server that distributes video (image).

The control server 510 includes a control unit 511. The control unit 511 controls the transmission device 100 in accordance with a request transmitted from the client 300. For example, the client 300 transmits, to the control server 510, a transmission request indicating whether pictures are divided and only part of them are (for example, only I pictures) transmitted or all pictures are transmitted. In accordance with the transmission request, the control unit 511 of the control server 510 transmits, to the transmission device 100, a control signal indicating whether to transmit (upload) part of the pictures to the server 200 in a divided manner or transmit all pictures to the server 200.

The transmission device 100 operates in a switching manner in accordance with the control signal transmitted from the control server 510, and transmits only some pictures divided as described above in the embodiment to the server 200 or transmits all pictures to the server 200.

In capture stream transmission (upload transmission), data divided as data (first data) to be transmitted to the server 200 is transmitted to the server 200. In capture file storage (file output), data divided as data (second data) to be stored in the storage 121 is not transmitted to the server 200 but is stored. As illustrated in FIG. 15, the stored data may be copied to the server 200 offline.

The server 200 converts (stream conversion) data received by the data reception unit 217 into a distributable format as necessary, and stores the converted data in the storage 222. The data copied offline may be converted all at once (batch conversion) and stored in the storage 222.

The storage 222 stores therein a picture (fragment file) in a distributable format, a distribution list, and the like. The server 200 functions as a video server that distributes a picture stored in the storage 222. As described above, data received by the data reception unit 217 may be stored in the temporary storage 221, and the data stored in the temporary storage 221 may be distributed by the distribution unit 216.

The client 300 includes a Web browser provided with a viewer. The Web browser is provided with a video player that plays back video. The video player is achieved as, for example, an application compatible with HTML5.

The Web server 520 is a server device having a function other than a function as a video server. For example, the Web server 520 is a server device for providing a user interface (UI) for an external system different from the video distribution system.

In this manner, the video distribution system according to the above-described embodiment can be achieved as a Web system used on, for example, the Internet.

As described above, in the video distribution system according to the present embodiment, it is possible to reduce the line load and the processing load without quality degradation.

Figure 16:
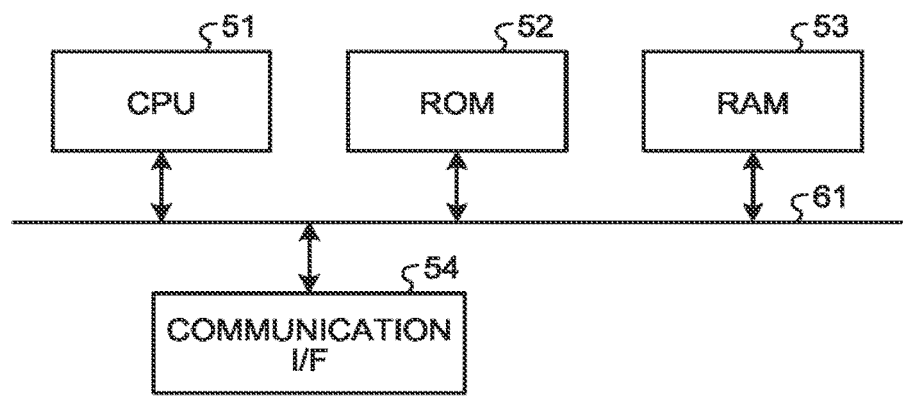
FIG. 16 is a hardware configuration diagram of a transmission device according to the present embodiment.

The following describes a hardware configuration of the transmission device according to the present embodiment with reference to FIG. 16. FIG. 16 is an explanatory diagram illustrating an exemplary hardware configuration of the transmission device according to the present embodiment.

The transmission device according to the present embodiment includes a control device such as a CPU 51, storage devices such as a read only memory (ROM) 52 and a RAM 53, a communication I/F 54 connected with a network to perform communication, and a bus 61 connecting these components.

A computer program to be executed by the transmission device according to the present embodiment is incorporated in the ROM 52 or the like in advance and provided.

The computer program to be executed by the transmission device according to the present embodiment may be recorded as a file in an installable or executable format on a computer-readable recording medium such as a compact disc read only memory (CD-ROM), a flexible disk (FD), a compact disc recordable (CD-R), or a digital versatile disc (DVD), and may be provided as a computer program product.

The computer program to be executed by the transmission device according to the present embodiment may be stored on a computer connected with a network such as the Internet and may be provided by downloading through the network. The computer program to be executed by the transmission device according to the present embodiment may be provided or distributed through a network such as the Internet.

The computer program to be executed by the transmission device according to the present embodiment can cause a computer to function as each component of the above-described transmission device. The computer can be achieved by the CPU 51 reading the computer program from a computer-readable storage medium onto a main storage device and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server device comprising:
one or more processors configured to:
receive first data as part of a plurality of pieces of transmission data, from a transmission device;
distribute the first data to a reception device;
receive, in accordance with a request for transmission of second data that is data other than the first data among the plurality of pieces of transmission data, the second data transmitted from the transmission device;
distribute the second data to the reception device; and
delete all or part of target data that is at least one of the first data and the second data stored in a storage, in accordance with a predetermined condition, the storage storing therein the first data and the second data transmitted from the transmission device, wherein
the target data includes first pictures and second pictures, and
the one or more processors delete part of the second pictures included in the target data every time a predetermined time elapses.

2. The server device according to claim 1, wherein
the one or more processors delete all or part of the target data stored for a predetermined duration.

3. The server device according to claim 1, wherein
the one or more processors perform the deleting from the storage by prioritizing target data distributed to the reception device.

4. The server device according to claim 3, wherein
the one or more processors determine whether the target data is distributed to the reception device by using metadata indicating whether the target data is distributed.

5. The server device according to claim 1, wherein
the one or more processors delete all or part of the target data by using metadata referred to in a deletion processing.

6. The server device according to claim 5, wherein
the metadata includes: a time, information indicating a position at which a start of a file including the target data is a criterion, and a name of the file.

7. The server device according to claim 1, further comprising the storage.

8. A transmission method comprising:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures, and
the deleting includes deleting part of the second pictures included the target data every time a predetermined time elapses.

9. A computer program product including a non-transitory computer readable medium including programmed instructions, wherein the instructions, when executed by a computer, cause the computer to perform:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures, and
the deleting includes deleting part of the second pictures included in the target data every time a predetermined time elapses.

10. The server device according to claim 1, wherein
the one or more processors delete the second pictures included in the target data.

11. The server device according to claim 10, wherein
the one or more processors delete the first pictures included in the target data after deleting the second pictures and when the predetermined time further elapses.

12. The server device according to claim 1, wherein
the one or more processors delete the first pictures included in the target data after deleting the second pictures and when the predetermined time further elapses.

13. The server device according to claim 1, wherein the one or more processors delete part of the first pictures included in the target data after deleting the second pictures and when the predetermined time further elapses.

14. The server device according to claim 1, wherein
the first pictures are played back alone, and
the second pictures are played back in combination with the first pictures.

15. A server device comprising:
one or more processors configured to:
receive first data as part of a plurality of pieces of transmission data, from a transmission device;
distribute the first data to a reception device;
receive, in accordance with a request for transmission of second data that is data other than the first data among the plurality of pieces of transmission data, the second data transmitted from the transmission device;
distribute the second data to the reception device; and
delete all or part of target data that is at least one of the first data and the second data stored in a storage, in accordance with a predetermined condition, the storage storing therein the first data and the second data transmitted from the transmission device, wherein
the target data includes first pictures and second pictures,
the one or more processors delete the second pictures included in the target data, and
the one or more processors delete part of the first pictures included in the target data after deleting the second pictures and when a predetermined time elapses.

16. A transmission method comprising:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures,
the deleting includes deleting the second pictures included in the target data, and deleting part of the first pictures included in the target data after deleting the second pictures and when a predetermined time elapses.

17. A computer program product including a non-transitory computer readable medium including programmed instructions, wherein the instructions, when executed by a computer, cause the computer to perform:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures,
the deleting includes deleting the second pictures included in the target data, and deleting part of the first pictures included in the target data after deleting the second pictures and when a predetermined time elapses.

18. A server device comprising:
one or more processors configured to:
receive first data as part of a plurality of pieces of transmission data, from a transmission device;
distribute the first data to a reception device;
receive, in accordance with a request for transmission of second data that is data other than the first data among the plurality of pieces of transmission data, the second data transmitted from the transmission device;
distribute the second data to the reception device; and
delete all or part of target data that is at least one of the first data and the second data stored in a storage, in accordance with a predetermined condition, the storage storing therein the first data and the second data transmitted from the transmission device, wherein
the target data includes first pictures and second pictures,
the one or more processors delete the second pictures included in the target data,
the first pictures are played back alone, and
the second pictures are played back in combination with the first pictures.

19. A transmission method comprising:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures,
the deleting includes deleting the second pictures included in the target data,
the first pictures are played back alone, and
the second pictures are played back in combination with the first pictures.

20. A computer program product including a non-transitory computer readable medium including programmed instructions, wherein the instructions, when executed by a computer, cause the computer to perform:
receiving first data as part of a plurality of pieces of transmission data, from a transmission device;
distributing the first data to a reception device;
receiving, in accordance with a request for transmission of second data that is data other than the first data among the plurality of pieces of transmission data, the second data transmitted from the transmission device;
distributing the second data to the reception device; and
deleting all or part of target data that is at least one of the first data and the second data stored in a storage, in accordance with a predetermined condition, the storage storing therein the first data and the second data transmitted from the transmission device, wherein
the target data includes first pictures and second pictures,
the deleting includes deleting the second pictures included in the target data,
the first pictures are played back alone, and
the second pictures are played back in combination with the first pictures.

* * * * *